Sept. 11, 1923.

H. P. KRAFT

DUST CAP FOR TIRE VALVES

Filed Aug. 23, 1920

Inventor
Henry P. Kraft
By his Attorney

Patented Sept. 11, 1923.

1,467,484

UNITED STATES PATENT OFFICE.

HENRY P. KRAFT, OF RIDGEWOOD, NEW JERSEY.

DUST CAP FOR TIRE VALVES.

Application filed August 23, 1920. Serial No. 405,414.

*To all whom it may concern:*

Be it known that I, HENRY P. KRAFT, a citizen of the United States of America, residing in Ridgewood, in the county of Bergen and State of New Jersey, have invented certain new and useful Improvements in Dust Caps for Tire Valves, of which the following is a specification.

This invention relates to dust caps for tire valves, or the like, and aims to provide certain improvements therein.

In an application filed on the same date herewith, Serial No. 405,415. I have illustrated a form of dust cap which, in its preferred construction, comprises a cap portion formed of longitudinal sections, a foot portion which is fastened to the cap portion, and which is adapted to screw on the tire valve. In such construction, I have shown, more particularly, a cap which is adapted to screw on a bushing, as distinguished from screwing directly on the valve casing.

The present invention includes such form of cap which screws on the casing, and also, in its broader aspects, includes a form of cap which is especially adapted for use in connection with oversized holes in the rim, it being provided with a flange at its foot which is adapted to contact with the rim, while the portion below the flange is adapted to enter the hole in the rim and center the tire valve therein. The invention also includes other features, which will be hereinafter more fully described.

Referring to the drawings, which illustrate the preferred form of the invention:

Figure 1:
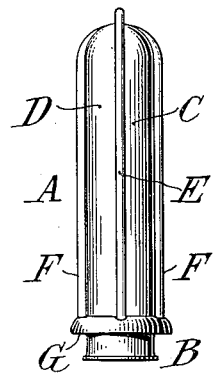
Figure 1 is an elevation of the cap.
Figure 2:
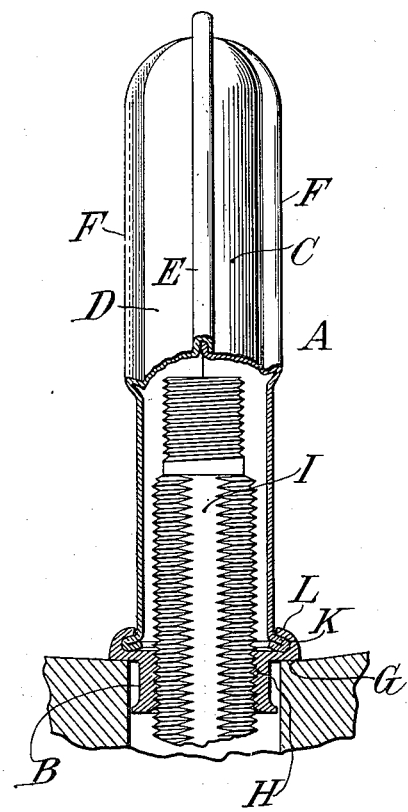
Figure 2 is a diametrical section of the cap partly in elevation, shown as applied to a tire valve.
Figure 3:
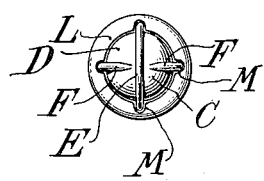
Figure 3 is a top view of Figure 1.

Referring to the drawings, let A indicate the cap portion and B the foot portion.

The cap portion is preferably formed in two longitudinal sections C and D, which are united by a flange such as E. Customarily ribs are formed, such as F, to secure a better fingerhold and make the cap more symmetrical.

The foot portion B is, by preference, circumferentially continuous, being cylindrical in form, and preferably constructed of a cup of sheet metal, drawn or pressed from a flat sheet, the cup having its bottom removed.

According to the present invention, the foot portion B has a wide flange G at its top, while the screw threaded portion H is sufficiently narrow in diameter to screw directly upon a valve casing, such as I. The cap portion has a sufficient internal diameter to permit it to slip over the casing.

The cap portion is best formed with a flange K, which rests against the upper face of the flange G, and a flange L on the foot portion is pressed down over the flange K. thus firmly connecting the cap and foot portions together. The flange L is notched at M to receive the flanges and ribs E and F, which construction secures a non-rotative engagement between the cap and foot portions.

The above construction provides a very cheap and durable cap, adapted for direct application to a tire valve.

The invention also includes the provision of a cap having a wide flange, such as G, spaced apart from its bottom to a certain extent, the flange being adapted to contact, on its under side, with a wheel felloe, such as O. It frequently happens that the hole through the rim is enlarged beyond the size necessary to receive the valve, with the result that there is considerable play between the valve and the walls of the hole. The present cap provides a depending portion, below the flange G, which may enter the hole in the rim, and thus center the valve while the flange G contacts with the inner edge of the felloe.

While I have shown and described the preferred form of the invention, it will be understood that I do not wish to be limited thereto, since various changes may be made therein, without departing from the spirit of the invention.

What I claim is:—

1. The combination with a wheel felloe having a valve hole therein of a valve of smaller diameter than said hole passing therethrough and a dust cap having a flange adapted to contact with the wheel felloe, and a portion below said flange of less diameter adapted to enter the valve hole in the felloe.

2. The combination with a wheel felloe having a valve hole therein of a valve of smaller diameter than said hole passing therethrough and a dust cap having a cap portion and a foot portion, the foot portion having a flange adapted to contact with a wheel felloe, and having a portion below such flange adapted to enter the valve hole in the felloe.

In witness whereof, I have hereunto signed my name.

HENRY P. KRAFT.